N. FRANZEN.
METHOD OF AND MACHINE FOR MAKING WIRE GLASS.
APPLICATION FILED MAY 18, 1908.
966,819.
Patented Aug. 9, 1910.
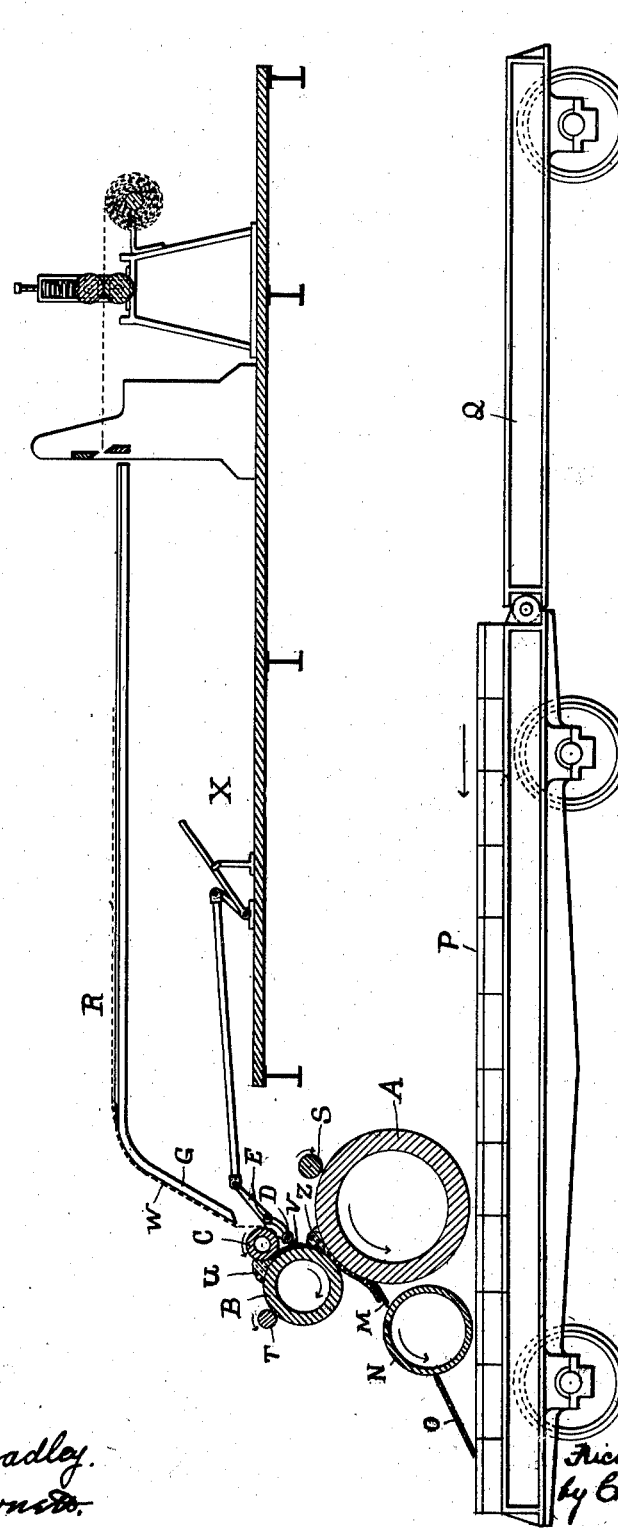
WITNESSES:
J. Herbert Bradley.
Charles Barnett.
INVENTOR
Nicklas Franzen
by Christy and Christy
Att'y

UNITED STATES PATENT OFFICE.

NICKLAS FRANZEN, OF WALTON, PENNSYLVANIA.

METHOD OF AND MACHINE FOR MAKING WIRE-GLASS.

966,819.  Specification of Letters Patent.  Patented Aug. 9, 1910.

Application filed May 18, 1908. Serial No. 433,458.

*To all whom it may concern:*

Be it known that I, NICKLAS FRANZEN, residing at Walton, in the county of Allegheny and State of Pennsylvania, a citizen of the United States, have invented or discovered certain new and useful Improvements in Methods of and Machines for Making Wire-Glass, of which improvements the following is a specification.

It has long been known to those who have experimented in such matters that glass which has been spread to sheet form between rolls is in certain respects more desirable than sheet glass which has been rolled out on a casting table; for instance, other things being equal, glass spread between rolls has a better surface appearance and is more transparent than glass spread on a casting table. Such differences are due, primarily, to the fact that, whereas glass spread on a casting table remains in place on the table until it has cooled to a considerable extent, glass spread between rolls is necessarily separated from the surfaces of the forming rolls almost immediately after being formed. Although such advantages have long been known, and although many inventors have designed machines for spreading glass between rolls, no such effort has been so far successful that glass spread between rolls has been of commercial importance. I have designed a machine of this character, the commercial value of which I have thoroughly tested.

My invention relates, in a general way, to methods of and mechanism for spreading glass between rolls, and, more specifically to the spreading of wire glass between rolls. Certain features of invention, however, will be found to be applicable not to the spreading of glass between rolls merely, but to the spreading of glass in any preferred manner.

I shall first describe the machine which I have designed, and then point out certain novel features in the method employed, as well as certain advantages in operation and result.

The accompanying drawing shows the machine in all its essential features partly in longitudinal section and partly in side elevation.

There are three glass-spreading rolls, A, B, and C, arranged in vertical sequence to form two roll passes. The three rolls rotate, and the intermediate roll, B, which coöperates with C above and A below to form the two passes, rotates in one direction and rolls A and C in the opposite direction, as is indicated by arrows in the drawing, to spread batches of hot glass to layer form.

Roll C does not stand directly above roll B, and roll A is not directly beneath, but roll B stands to one side, and, roll B turning from left to right, the rolls A and C coöperate with it on the right hand side; if the direction of rotation were opposite, the arrangement would be reversed. In consequence of this staggered arrangement of the rolls, the two roll passes are so disposed that hot glass may be teemed into the hopper-like receptacles which the roll bodies form, above each roll pass, and retained there by gravity, while the rotating rolls spread the layers. Smaller rolls, S and T, or equivalent means may be arranged to coöperate with rolls A and B, respectively, to retain any excess of glass teemed to the several roll passes and prevent its escape over the opposite surfaces of the large rolls. In the machine which I have built and used, the glass-retaining roll S is in fact the power shaft of the machine. Furthermore, by such a staggered arrangement of the glass-forming rolls as I have described, it is possible to have the planes of the two roll passes equally inclined to the vertical; and this is a feature which I consider of some importance, for in consequence the two batches of glass are spread under like conditions. More particularly, I preferably arrange rolls A and B to coöperate at a point approximately half way down the lower right hand quadrant of roll B, and in like manner roll C coöperates with roll B at a point half way down the upper right hand quadrant of roll B; and, consequently, the planes of the two passes, which are tangential to roll B at the centers of the two roll passes, are equally inclined, at angles of 45° to the perpendicular, and, incidentally, the upper roll pass is directly above the lower.

While I do not consider the relative sizes of the three glass-forming rolls essential to my invention in its broadest aspect, the dimensions must be such as to permit proper handling of the glass. The ratio in size of the two rolls which forms each roll pass is preferably substantially the same; and in the machine which I have built and operated, roll B is approximately half the diameter of roll A, and roll C in turn half the diameter of roll B. Such an equation tends to uniformity in product.

This arrangement of the three glass-forming rolls admits of them being mounted in suitable housings where they are readily accessible for all purposes. I preferably mount these rolls in adjustable journals, so that their relative positions may be varied as desired and adjusted with the greatest nicety, but such adjustments are well known in rolling-mill building, and I have deemed it unnecessary to illustrate and describe my machine in such details. The two roll passes are of different width, the lower being the wider, and ordinarily about twice as wide as the upper.

The operation will be readily apparent. A batch of hot glass U, teemed into the hopper-like space formed by the adjacent upper surfaces of rolls B and C, is by the rotation of the said rolls in the directions indicated by the arrows reduced beneath roll C to the form of a layer upon the adjacent upper surface of roll B. As roll B rotates its surface covered with this initial layer of glass approaches the pass between itself and roll A. In consequence of the presence of this initial layer of glass upon roll B, it will be understood that the effective width of the lower roll pass is reduced, and in case the actual widths of the two passes are as one to two, the effective widths will be in fact the same. In this second and lower roll pass a second batch of hot glass Z, teemed in between rolls A and B, is spread to layer form and united with the initial layer, so that in fact roll B spreads the completed sheet upon the adjacent upper surface of roll A.

It will be observed that, in consequence of the arrangement of rolls A, B, and C as I have described, the initial layer of glass is first formed upon the curved face of roll B and is subsequently united with a second layer of glass to form a finished sheet upon the curved face of roll A. The initial layer, then, advances in a path of double and reversed curvature. This is a feature of value, for the bending of the newly spread glass first in one direction and then in the other improves its quality. It is further to be observed that, in consequence of the inclination of the roll passes, the two batches of glass do not rest directly above the roll passes, and that the batch of glass Z, instead of being banked deep against the layer of glass borne by roll B, is spread somewhat over the upper surface of roll A and its edge which bears against the initial layer is comparatively shallow. This is a feature of advantage.

The description up to this point has concerned the rolling of glass, without particular regard to the introduction of the wire; and, as I have already explained, the invention has broadly to do with the spreading of glass, whether wire be introduced or not. The machine is, however, primarily intended for the making of wire glass, and while I have used it to a considerable extent for making skylight glass without any wire inlay, I have used it chiefly as a wire-glass machine.

In the operation of this machine, the initial layer descends on the face of rotating roll B to meet a batch of unformed glass Z immediately above the lower roll pass. I introduce the wire at the line of union between the initial layer and the glass of the second batch Z. The introduction of the wire under proper conditions is a critical feature of such a machine. In my machine it is possible to accomplish two very desirable ends which cannot in the nature of things be simultaneously accomplished in the ordinary table machine. One of these two ends is to maintain the wire out of contact with either the initial layer on one side and with the batch of glass for the second layer upon the other, until it is caught and buried by the uniting bodies of glass; thus undue oxidation of the wire is avoided, and opportunity is afforded to compensate for thermal expansion of the wire. The other of the two desirable ends which I accomplish is that the plane of the wire as it advances to the glass is normally made coincident with the plane of the initial layer at the point of union of the three bodies; in consequence of this, the wire is free of any strain tending to draw it aside from a truly central position. I here speak of the plane of the approaching web of wire as coincident with the plane of the initial layer; in my machine that initial layer approaches the point of union in a curved path, and the path of the wire is accordingly tangential to the surface of the layer of glass. At this point of union of the two bodies of glass and the wire, the initial layer being already formed and relatively firm, the wire sinks in the hot glass of the unformed batch Z, and lies in the glass of the second layer, but directly against the glass of the initial layer. Coming now to the mechanism by which these ends are accomplished, I provide means for supporting the free end of the wire above and adjacent to the lower roll pass, and the traction of the rolls upon the glass as it closes upon the wire draws the wire down to position in the sheet as it is being formed. Not only do I support the free end of the wire; I also place resistance upon its free descent; I draw the wire taut between the place of support and the roll pass. Thus I am able to control the direction of its descent the more accurately, and I am also able to eliminate to a considerable extent the objectionable effects of thermal expansion. As the descending wire approaches the hot glass, it becomes hot and expands, and, being drawn taut, the effect is that the descent from above is slightly retarded and the wire enters the glass in better condition, for as the completed sheet cools there will be less movement of the wire within it than would be the case if the wire had been buried in the hot glass, unexpanded.

I have said that normally the wire comes to the place of union of the two bodies of glass in a plane coincident with the plane of the initial layer. I have found however that it is desirable to provide for a certain adjustment here; and that while normally the path of the wire is as I have defined it, there are times when it is advantageous to be able to shift and control the direction of the approach of the wire to some extent. The reason for this lies in the fluctuating condition of the glass; if the batch Z be relatively hot and fluid, the path of the wire will be carried slightly out of normal, so that the approaching wire will hug the surface of the initial layer more closely and prevent the fluid glass from batch Z from running beneath and completely closing upon the strands of the wire; but if the batch Z be relatively viscid, the wire will descend in a patch deviating from the normal in opposite direction. The object being in every case to cause the glass of the batch Z to flow through the meshes of the wire and inclose it against the surface of the initial layer; but if the hot glass of batch Z be permitted to close completely around the strands of wire, not only will the wire be misplaced in the finished sheet, but it will be liable to distortion and tearing in the roll pass.

Specifically the wire support consists of a bar D, preferably a small roller, over which the wire is drawn in its descent. The ends of this roller are journaled in a pair of levers F, so arranged that the operator of the machine may shift and control the position of the roll D transversely above the lower roll pass, and thus adjust the path of the descending wire for the purposes stated above.

Coöperating with the support D, the means for retarding and placing tension upon the wire are a chute G which delivers the wire against the exposed face of roll C—that is, the face opposite to the pass between rolls B and C—and roll C itself. The delivery end of chute G and roller D are so disposed with relation to roll C that the path of descending wire is deflected around roll C, the wire is caused to bear upon roll C, and the frictional drag upon the wire, augmented as it is by the rotation of the roll C in opposition to the descent of the wire, produces the tension which effects the objects desired and described above.

It remains to be noted that in this machine the wire is kept out of contact with the glass until it is actually buried, and thus discoloration through oxidation is guarded against, and that the heated wire is stretched as it approaches the point of its application to the glass and that thus the injurious effects of thermal expansion are to a great extent eliminated.

For convenience and economy I arrange a table for the wire of approximately the length of the sheets of wire glass to be rolled in substantially horizontal position at a higher level than the glass-forming rolls. This table terminates in the chute G over which the wire is carried down to the machine. Beyond the opposite end of the table a reel of wire may be arranged, and at the end of the table adjacent to the wire reel a shear mechanism may be placed. Thus, a suitable length of wire may be drawn out on the table, sheared off, and fed into the machine with the least amount of handling. The wire as it is unwound from the reel may be caused to pass between a pair of straightening rolls. I have designed also means for economically handling the newly finished sheet. A transfer table P is mounted to travel beneath the glass-forming rolls, and driving means are provided, so that the table advances in the direction indicated by an arrow as the rolls turn to spread the glass in the manner described. A chute, M O, whose continuity is interrupted by the upper surface of a drum N, is arranged to receive the finished sheet from the descending upper surface of roll A and deliver it to the transfer table advancing beneath. Drum N is positively driven in the direction indicated by an arrow. It will be observed that as the finished sheet descends over the chute it is flexed back and forth with consequent benefit.

I claim as my invention:

1. In a machine for making rolled glass, three rolls combined and arranged to form two rolls passes in which two batches of glass may be spread to superposed layers, the planes of the two said roll passes being equally inclined, substantially as described.

2. In a machine for making rolled glass, three glass-forming rolls, differing from one another in size, and arranged in vertical succession, the largest roll being lowest in position and the smallest highest, and the roll of intermediate size coöperating with the smaller roll above to form a roll pass in which glass may be spread, and with the larger roll below to form another and wider pass for spreading glass, substantially as described.

3. In a machine for making rolled glass, the combination of a horizontally-extending rotating roll, a second roll parallel with the first rotating in opposite direction and coöperating with the upper surface of the first roll to form a roll pass in which a batch of hot glass may be spread to layer form upon the surface of the first named roll, and a third roll parallel with the first, rotating in opposite direction with relation thereto, and coöperating with the lower surface of the first named roll to form a roll pass of greater width in which a batch of hot glass may be spread to layer form by said first named roll when faced with a layer of glass upon the surface of the third and last named roll, substantially as described.

4. In a machine for making rolled glass, the combination of three rolls coöperating to form two roll passes, the ratio in size of the pair of rolls which forms each roll pass being the same, substantially as described.

5. In a machine for making rolled glass, the combination of a horizontally extending rotating roll, a second roll of relatively small size parallel with the first, rotating in opposite direction and coöperating to form with the first roll a roll pass in which hot glass may be spread at a point half way down the upper descending quadrant of the first named roll, and a third roll of relatively large size parallel with the first, rotating in opposite direction and coöperating to form with the first roll a roll pass in which hot glass may be spread at a point half way down the lower descending quadrant of the first named roll, substantially as described.

6. In a machine for making rolled glass, the combination of means for spreading an initial layer of glass upon a cylindrical surface, and a second cylindrical surface upon which a second layer of glass is spread and united with the initial layer by the coöperation of the first named cylindrical surface, the two cylindrical surfaces being so arranged that the initial layer advances in a path of reverse curvature while borne by and upon said second surface, substantially as described.

7. In a machine for making wire glass, the combination of a forming surface, a roll suitably spaced from said forming surface and forming therewith a pass in which molten glass may be spread to sheet form, a support for the free end of a web of wire while being fed into said pass, such wire support being movable laterally in relation to said roll pass, and means for shifting and controlling the position of said wire support as the operation of the machine progresses, substantially as described.

8. In a machine for making wire glass, the combination of a forming surface, a roll suitably spaced from said forming surface and forming therewith a pass in which molten glass may be spread to sheet form, a wire feeding device, arranged adjacent to said pass from which wire may be introduced to said pass, said feeding device including two rolls arranged in positions parallel to said first named roll, and at unequal distances from said pass, the roll nearer to said pass being movable in transverse direction, substantially as described.

9. In a machine for making wire glass the combination with a pair of rolls forming a pass in which two bodies of glass are united upon an interposed web of wire, of a support for the free portion of the web of wire when an adjacent portion is introduced with two bodies of glass into said roll pass, such wire support being laterally movable with respect to said roll pass, whereby the extent or degree to which the wire shall sink into the soft substance of one of such bodies of glass may be determined during the shaping of the glass by said rolls, substantially as described.

10. In a machine for making wire glass, the combination of three rolls arranged in vertical sequence and forming an upper and lower roll pass wherein glass may be spread to layer form, means for holding a web of wire at one portion of its length in frictional contact with the exposed surface of the uppermost of said three rolls while at another portion of its length such web of wire is being entrained in said lower roll pass, substantially as described.

11. In a machine for making wire glass the combination with a rotating glass-forming roll, of a chute arranged to deliver wire against the surface of said roll, and a bar arranged adjacent to said roll, the three parts being so disposed that a web of wire may be held by the delivery end of said chute and by said bar in frictional contact with the surface of said roll while the rotation of said roll where it makes contact with said wire tends to drag said wire upward against the tendency of the wire to descend in response to gravity, substantially as described.

12. In a machine for making wire glass, the combination with means for spreading superposed layers of glass, means for introducing a web of wire at the point where the glass of the second layer meets the first layer in a plane coincident with the plane of the surface of the initial layer at the point of contact, substantially as described.

13. In a machine for making wire glass, the combination with means for spreading a sheet of wire glass upon a rotating cylindrical surface, of a transfer table advancing as the rotating cylinder carries forward the finished sheet of wire glass, an inclined chute over which the finished sheet of wire glass is delivered from the rotating cylinder to the transfer table, and a cylindrical drum arranged parallel to the first named rotating cylinder, rotating in unison with said first named cylinder, the said last named cylindrical drum being so arranged that its upper surface fills a break in the continuity of said inclined chute, these parts being so arranged that the finished sheet of wire glass is flexed alternately in opposite directions as it descends to said transfer table, substantially as described.

14. The method of making wire glass described herein which consists in spreading an initial layer of glass, spreading a second batch of hot glass to layer form against the said initial layer while said initial layer is maintained in curved form, and while said second layer is being spread introducing a taut-drawn web of wire free from previous contact with either the initial layer on one side or the batch of hot glass on the other at the point of union of the two bodies of glass and in a plane substantially tangential to the curved surface of the initial layer at the point of union.

15. The herein-described method of making rolled glass which consists in spreading a layer of glass in curved form, spreading another layer of glass against the convex surface of said first formed layer and at the same time bending said first formed layer into reverse curvature, and finally flattening the compound sheet so formed.

16. The method of making wire glass described herein, which consists in first spreading a batch of hot glass to a layer of curved form, then spreading another batch of hot glass to layer form against one surface of the initial layer, and at the same time with the spreading of the second batch of glass introducing between the two bodies of glass a taut-drawn web of wire netting in a plane tangential to the curve of the initial layer at the point of union and bending the whole into reverse curvature, and finally flattening the completed sheet.

In testimony whereof, I have hereunto set my hand.

NICKLAS FRANZEN.

Witnesses:
CHARLES BARNETT,
FRIEDA E. WOLFF.